No. 895,351.

PATENTED AUG. 4, 1908.

W. A. DROMGOLD.
CULTIVATOR.
APPLICATION FILED JAN. 23, 1908.

Witnesses.
Robt Everitt.
H. Lee Helms.

Inventor.
Walter A. Dromgold.
By Hamelin Philey
Atty.

UNITED STATES PATENT OFFICE.

WALKER A. DROMGOLD, OF YORK, PENNSYLVANIA.

CULTIVATOR.

No. 895,351.

Specification of Letters Patent.

Patented Aug. 4, 1908.

Application filed January 23, 1908. Serial No. 412,334.

To all whom it may concern:

Be it known that I, WALKER A. DROMGOLD, of the city of York, in the State of Pennsylvania, have invented certain new and useful Improvements in Cultivators, of which the following is a specification.

This invention has to do with means for adjusting the shovels to different angles as required.
I shall first describe my improvements in connection with the accompanying drawings, and will then point them out more particularly in the claim.

Figure 1:
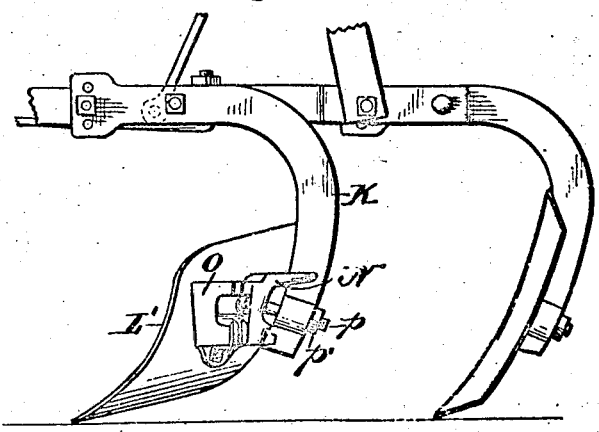
Figure 2:
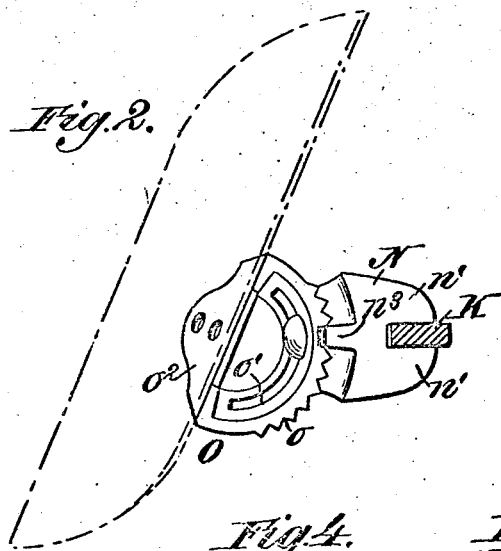
Figure 3:
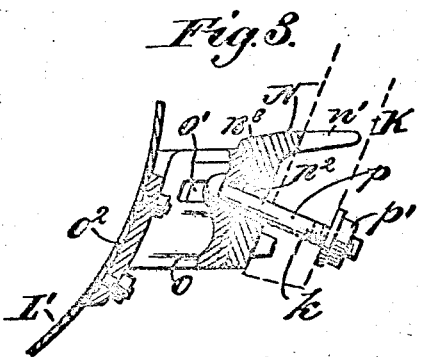
Figure 4:
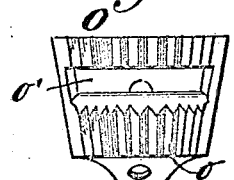
Figure 5:
Figure 6:

In the drawings—Figure 1 is a side elevation of the rear portion of a cultivator showing one of the shovel standards provided with adjustable fastening means embodying my invention. Fig. 2 is a plan of one of the devices for adjustably fastening the shovel to the beam—the shovel (of the "horse hoe" kind) being in dotted lines, and the shovel standard K in section. Fig. 3 is a vertical central section of the same with the shovel standard K in dotted lines, and the fastening bolt $p$ in elevation. Fig. 4 is a rear elevation of that portion of the shovel fastening device which I term the "shovel block". Fig. 5 is a front elevation of that part of said device which I term the "saddle". Fig. 6 is a perspective view of the "saddle".

The means for adjusting the shovels which I have devised may be used in connection with shovels or cultivator teeth of any usual or suitable construction; but they have been designed more particularly for use with what are known as "horse hoe" shovels, and it is in this connection that I shall describe them. By "horse hoe" I intend that form of shovel such as shown at L' used to draw furrows and to throw the earth therefrom inwards or outwards as desired, according to the angle at which they are set.

The ordinary reversible cultivator tooth or shovel is shown at L. The rear shovels L' on the expanding outer beams C are horse hoe shovels and it is to these that my improved adjusting means are applied. It is my object to simplify the adjusting means and at the same time to render the same more efficient in respect of ease of adjustment and solidity of hold on the shovel after the adjustment has been effected. With this in view I provide a ratchet faced saddle N having on its back forks $n'$ which straddle and fit closely upon the standard K to which the saddle is applied and formed with a hole $n^2$ which will register with the hole $k$ in the standard through which the usual shovel attaching bolt passes.

The face $n$ of the saddle is concave and widest at the top, thence tapering towards its lower end, having the form of the section of a cone, or, more accurately speaking, a frusto-conical section; and it is formed with longitudinal ratchet ribs which are correspondingly wider apart from one another at the top and thence gradually converging as they approach the lower end of the saddle. Upon the shovel L' is the device which I have hereinbefore termed the shovel block, consisting of a hollow casting O having a front face adapted to fit against, and be attached to, the shovel L, and a rear face $o$ which is concave and tapering or of frusto-conical section, to match and fit the concave $n$ in the saddle; and it is also provided with longitudinal converging ratchet ribs to match and engage the ratchet ribs of the concave $n$. Through the convex ratchet face $o$ of the hollow shovel block is formed a horizontal slot $o'$, through which passes bolt $p$, the screw threaded end of which extends through hole $n^2$ in the saddle and hole $k$ in standard K, and is provided with nut $p'$ to draw the bolt so as to both clamp the block and saddle together and to hold both of them tightly and immovably in place on the standard. By loosening the bolt the ratchet faces of the shovel block and saddle can be disengaged far enough to allow the block to be turned or rotated horizontally in the concave $n$ to set the shovel at any desired angle of obliquity—the slot $o'$ permitting this movement. The tapering concave and convex meeting faces of the block and saddle, as hereinbefore pointed out, are matching frusto-conical sections; and the rotary or turning movement of the block for purposes of adjustment is in fact axial, that is to say, about the axis of the cone.

When the parts are drawn together by the bolt $p$, the engagement of the ratchet ribs on the meeting concave and convex faces of the saddle and block, will prevent any rotary or turning movement of the block in a horizontal plane and will also resist any tendency to longitudinal slip of the block either upward or downward. The resistance to downward slip of the block is enhanced by the taper formation of the concave and convex meeting faces of the saddle and block; while resistance to upward slip of the block is enhanced by a lug or shoulder $n^3$ on the saddle which overhangs the upper edge of the block.

The broad extended bearing afforded by the ratcheted meeting faces of the saddle and block hold the shovel most securely and firmly in place against any of the shocks and strains to which it may be subjected. The device as a whole, consisting, as it does in substance, of two castings, is simple and inexpensive; and the one bolt $p$ both holds the two castings together and secures them to the standard.

Having described my improvements and the best way now known to me of carrying the same into practical effect I state in conclusion that I do not limit myself narrowly to the structural details hereinbefore described and illustrated since manifestly the same can be varied without departure from the spirit of my invention. But

What I claim herein as new and desire to secure by Letters Patent is as follows:

1. In combination with the shovel standard, the saddle and the hollow casting O having longitudinally-tapering concave and convex meeting faces formed with correspondingly converging longitudinal ratchet ribs and adjustable axially one relatively to the other, and means for securing said parts together and to the standard, substantially as and for the purposes hereinbefore set forth.

2. In combination with the shovel standard, the saddle and the shovel block having concave and convex meeting faces formed with correspondingly converging longitudinal ratchet ribs, tapering lengthwise towards their lower ends and adjustable axially relatively to one another, a stop or overhang on the block to prevent upward slip of the saddle, and means for securing the saddle and block together and to the standard, substantially as and for the purposes hereinbefore set forth.

In testimony whereof I affix my signature in presence of two witnesses.

WALKER A. DROMGOLD.

Witnesses:
T. E. DROMGOLD,
A. N. SANDERS.